US011306254B2

(12) United States Patent
Liu et al.

(10) Patent No.: US 11,306,254 B2
(45) Date of Patent: Apr. 19, 2022

(54) POT FURNACE LOW-TEMPERATURE CALCINATION PROCESS

(71) Applicant: CHINA ALUMINUM INTERNATIONAL ENGINEERING CORPORATION LIMITED, Beijing (CN)

(72) Inventors: Chaodong Liu, Liaoning (CN); Shanhong Zhou, Liaoning (CN); Haifei Xu, Liaoning (CN); Yi Sun, Liaoning (CN); Yinhe Cui, Liaoning (CN)

(73) Assignee: CHINA ALUMINUM INTERNATIONAL ENGINEERING CORPORATION LIMITED, Beijing (CN)

( * ) Notice: Subject to any disclaimer, the term of this patent is extended or adjusted under 35 U.S.C. 154(b) by 388 days.

(21) Appl. No.: 15/510,372

(22) PCT Filed: Sep. 10, 2015

(86) PCT No.: PCT/CN2015/089350
§ 371 (c)(1),
(2) Date: Mar. 10, 2017

(87) PCT Pub. No.: WO2016/037582
PCT Pub. Date: Mar. 17, 2016

(65) Prior Publication Data
US 2017/0260455 A1 Sep. 14, 2017

(30) Foreign Application Priority Data
Sep. 10, 2014 (CN) .......................... 201410454873.X

(51) Int. Cl.
*C10B 47/04* (2006.01)
*C10B 57/00* (2006.01)
*C10L 9/08* (2006.01)
*C01B 32/05* (2017.01)

(52) U.S. Cl.
CPC ............ *C10B 57/005* (2013.01); *C01B 32/05* (2017.08); *C10L 9/08* (2013.01); *C01P 2006/10* (2013.01); *Y02P 20/129* (2015.11)

(58) Field of Classification Search
CPC .............................. C10B 32/05; C10B 57/005
See application file for complete search history.

(56) References Cited

U.S. PATENT DOCUMENTS 3,966,560 A * 6/1976 Farago .................... C10B 49/04
201/1

FOREIGN PATENT DOCUMENTS

| CN | 101264877 A | 9/2008 |
| CN | 101792135 A | 8/2010 |
| CN | 102976309 A | 3/2013 |

OTHER PUBLICATIONS

CN First Office Action corresponding to Application No. 201410454873; dated Mar. 3, 2017.
International Preliminary Report on Patentability and Written Opinion of the International Search Authority for corresponding International Application PCT/CN2015/089350; dated Dec. 8, 2015.
Zhu et al., "Discussion and practices of petroleum coke high temperature calcination technology," Mar. 2010, pp. 33-37; with English Abstract.
Jingli Zhao et al., "New Generation of Vertical Shaft Calciner Technology," Light Metals 2011, pp. 917-918, 2011.
Yi Sun et al., "Comparison between Vertical Shaft Furnace and Rotary Kiln for Petroleum Coke Calcination," (Shenyang Aluminium and Magnesium Engineering and Research Institute, Shenyang 110001, China), Nov. 2, 2010; 16 pages.

* cited by examiner

*Primary Examiner* — Stuart L Hendrickson
(74) *Attorney, Agent, or Firm* — Cantor Colburn LLP

(57) ABSTRACT

A pot furnace low-temperature calcination process may ensure that, by controlling the flame path temperature and discharge speed of the pot furnace, that the range of the temperature at which the petroleum coke is calcined in the pot is from 1150° C. to 1220° C., and that the discharge speed is 10 to 20% higher than the normal discharge speed and reaches 110~120 kg/h, reducing the amount of desulfurization of the petroleum coke during the calcination so that the true density of the calcined coke is between 2.05 and 2.07 g/cm$^3$.

5 Claims, 1 Drawing Sheet

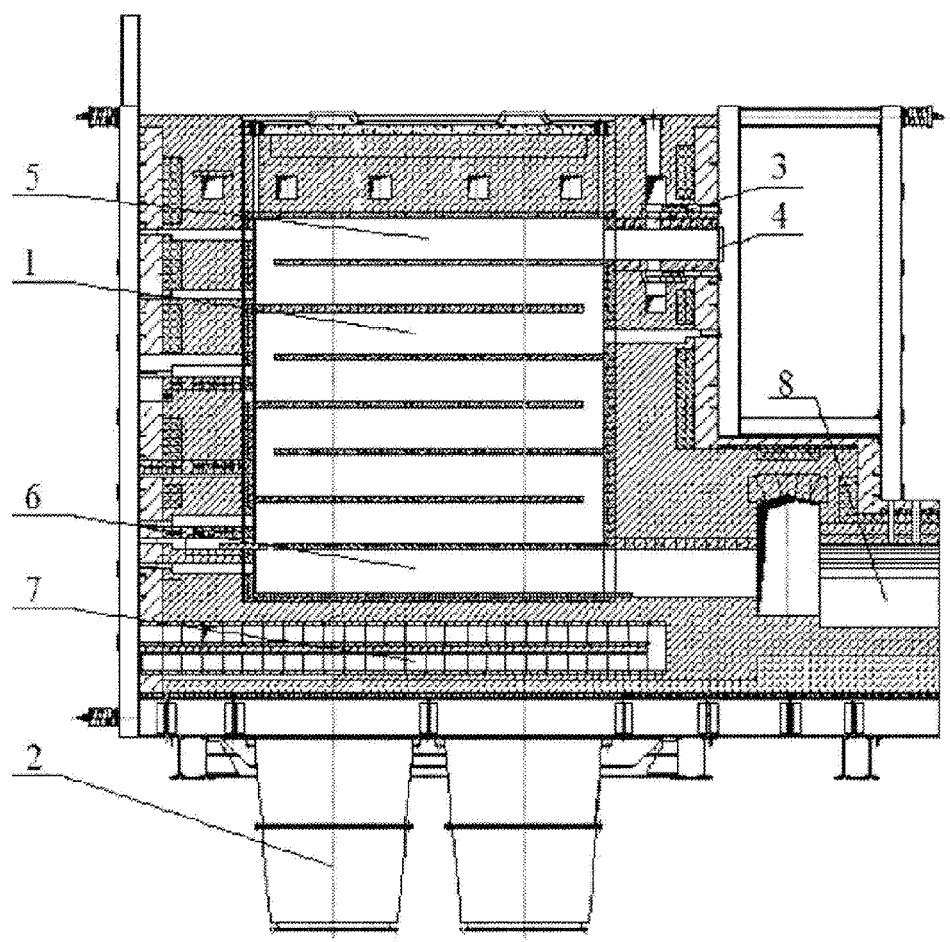

POT FURNACE LOW-TEMPERATURE CALCINATION PROCESS

This is the U.S. national stage of application No. PCT/CN2015/089350, filed on Sep. 10, 2015. Priority under 35 U.S.C. § 119(a) and 35 U.S.C. § 365(b) is claimed from Chinese Application No. 201410454873.X, filed Sep. 10, 2014, the disclosure of which is also incorporated herein by reference.

TECHNICAL FIELD

The present invention relates to a process of calcining petroleum coke at low temperature, and in particular to a process of calcining petroleum coke at low temperature with a pot furnace for producing anode, cathode and electrode for aluminum in the carbon industry, and for use in the special carbon industry.

BACKGROUND ART

Due to large-scale electrolytic bath's higher requirements for the quality of the pre-baked anode and control of the anode production cost, most enterprises use pot furnaces to calcine petroleum coke. The advantages of pot furnaces in calcined coke quality and yield become more evident. This is mainly because during calcination in the pot furnace the petroleum coke is heated indirectly by high temperature gas, has a high calcination temperature and has a long calcination time. The calcination temperature can reach 1250° C.~1350° C.; the discharge speed is generally about 100 kg/h; the true density of the calcined coke can reach about 2.08~2.10 g/cm$^3$; and carbon burning loss during the calcination is only 3~4%.

However, with the decline in the quality of petroleum coke products of petrochemical enterprises, as well as purchase of low-cost high-sulfur coke in great amounts by enterprises to reduce the production cost of calcined coke, the sulfur content in the petroleum coke calcined in pot furnaces increases significantly, which brings about a series of problems:

1) Sulfur in petroleum coke corrodes the silicon brick of the body of the pot furnace in the high temperature calcination process, resulting in reduced service life of the silicon brick and thus a direct reduction in the service life of the pot furnace. The service life of pot furnaces could reach 10 years in the past, but with the use of high-sulfur coke, the service life decreases directly to 3 to 4 years; and
2) Sulfur, which precipitates during high temperature calcination, enters the flue gas and generates SO2, leading to a sharp increase in the concentration of SO2 in the flue gas, even up to 4000~6000 mg/Nm3 in some cases. This not only reduces the service life of the smoke exhaust system equipment, but also greatly increases the difficulty and cost of desulfurization.

SUMMARY OF THE INVENTION

In order to solve the aforesaid problems, the present invention proposes a pot furnace low-temperature calcination process, which aims to preserve the advantages of existing pot furnaces and reduce the adverse effects of high sulfur coke on the furnace service life and flue gas desulfurization while ensuring the quality of the calcined coke.

To achieve this purpose, the present invention a pot furnace low-temperature calcination process ensures, by controlling the flame path temperature and discharge speed of the pot furnace, that the range of the temperature at which the petroleum coke is calcined in the pot is from 1150° C. to 1220° C., and that the discharge speed is 10 to 20% higher than the normal discharge speed and reaches 110~120 kg/h, reducing the amount of desulfurization of the petroleum coke during the calcination so that the true density of the calcined coke is between 2.05 and 2.07 g/cm3, thereby meeting the prebaked anode's requirement for the quality of the calcined coke.

The process further comprises combustion-supporting air, which is the cold air in the environment directly sucked into the flame path from the first flame path layer via the negative pressure in the flame path to support the combustion, ensuring that the temperature in the flame path is below 1250° C.

The air inlet of the first flame path layer is provided with a flame path flashboard for controlling the amount of cold air into the flame path.

Air within the pot furnace bottom cooling channel is discharged directly, without participating in supporting the combustion in the flame path.

The process further comprises that the negative pressure in the main flue reaches −250 Pa~−300 Pa, the negative pressure in the eighth flame path layer reaches −120 Pa~−150 Pa, and the negative pressure in the first flame path layer reaches −30 Pa~−40 Pa.

The process further comprises that the discharge amount per unit time increases, the amount of volatiles which precipitate from the petroleum coke and enter the flame path for combustion increases 10% to 20%, and the flue gas flow in the flame path increases 10% to 20%.

The present invention has the following advantageous effects. It prevents the phenomenon of over-calcination which might happen when producing calcined coke for pre-baked anode with a pot furnace, by reducing the flame path temperature. A relatively low calcination temperature and a relatively short residence time reduce the desulfurization amount in the petroleum coke calcination process, reduce the sulfur dioxide content in the flue gas and the pressure of flue gas purification. Reduction in the temperature of the furnace body and in the desulfurization slows down the corrosion of the silicon brick by sulfur in the petroleum coke and greatly increases the service life of the furnace body in the case of calcination of high-sulfur coke in the pot furnace. An increase in the discharge speed enhances the production capacity of the pot furnace, and increases the amount of flue gas in the system, facilitating an increase in the waste heat steam productivity.

BRIEF DESCRIPTION OF THE DRAWING

FIG. 1 is a cross-sectional view of the flame path portion of the present invention.

In the FIGURE:
1 flame path,
2 pot,
3 volatile channel,
4 the first flame path layer flashboard,
5 the first flame path layer,
6 the eighth flame path layer,
7 furnace bottom cooling channel,
8 main flue.

EMBODIMENTS

The present invention will be described below in detail with reference to the embodiments, which, however, do not limit the protection scope of the present invention.

As shown in FIG. 1, the calcination material petroleum coke comes from top to bottom to undergo the whole calcination process in the pot 2. The high temperature flue gas flows in the flame path 1 to realize indirect heating of the petroleum coke.

By controlling the flame path temperature and discharge speed of the pot furnace, it is ensured that the range of the temperature at which the petroleum coke is calcined in the pot is from 1150° C. to 1220° C., and that the discharge speed is 10 to 20% higher than the normal discharge speed and reaches 110~120 kg/h, reducing the amount of desulfurization of the petroleum coke during the calcination so that the true density of the calcined coke is between 2.05 and 2.07 g/cm3. The flame path includes eight layers.

The combustion-supporting air is the cold air in the environment which is sucked directly into the flame path through the first flame path layer via the negative pressure in the flame path to support the combustion, ensuring that the temperature in the flame path is below 1250° C.

The air inlet of the first flame path layer is provided with a flame path flashboard for controlling the amount of cold air into the flame path.

Air within the pot furnace bottom cooling channel 7 is discharged directly out of the vent at the top of the furnace, without participating in supporting the combustion in the flame path.

The negative pressure in the main flue 8 reaches −250 Pa~−300 Pa, the negative pressure in the eighth flame path layer 6 reaches −120 Pa~−150 Pa, and the negative pressure in the first flame path layer 5 reaches −30 Pa~−40 Pa. A sufficiently large negative pressure ensures that sufficient cold air enters the flame path and reduces the temperature in the flame path. Meanwhile, a great negative pressure can improve the uniformity of temperatures in all flame path layers.

The amount of volatiles, which precipitates from the petroleum coke per unit time and enters the flame path for combustion, increases 10% to 20%. The amount of volatiles combusted in the flame path and the flue gas flow in the flame path are increased while reducing the residence time of the petroleum coke in the furnace.

The volatiles of the petroleum coke enter the first flame path layer 5 via the volatile channel 3. The combustion-supporting air enters the first flame path layer 5 via the first flame path layer flashboard 4 as a result of the negative pressure in the flame path. Meanwhile, the amount of air that enters the first flame path layer 5 is controlled by adjusting the first flame path layer flashboard 4, to ensure that the temperature in the flame path is below 1250° C.

The invention claimed is:

1. A pot furnace low-temperature calcination method comprising:
   providing a pot;
   providing a flame path proximate to the pot such that heat from the flame path heats the pot;
   controlling a flame path temperature and discharge rate of the pot furnace such that petroleum coke is calcined in the pot at a temperature range from 1150° C. to 1220° C., the discharge rate of the pot being controlled to be 110~120 kg/h; and
   reducing an amount of desulfurization of the petroleum coke during calcination so that true density of the calcined coke is between 2.05 and 2.07 g/cm$^3$;
   wherein the flame path temperature is controlled to be less than 1250° C.

2. The pot furnace low-temperature calcination method according to claim 1, wherein the flame path comprises a first flame path layer among a plurality of flame path layers, the first flame path layer being a furthest flame path layer from the pot;
   wherein the controlling a flame path temperature further comprises introducing combustion-supporting air which is cold air from an exterior environment into the first flame path layer by applying a negative pressure in the flame path, ensuring that temperature in the flame path is below 1250° C.

3. The pot furnace low-temperature calcination method according to claim 2, wherein the first flame path layer further comprises a valve for controlling and adjusting an amount of cold air into the flame path.

4. The pot furnace low-temperature calcination method according to claim 1, wherein air within a bottom cooling channel provided between the flame path and the pot is discharged directly, without participating in supporting combustion in a flame path.

5. The pot furnace low-temperature calcination method according to claim 2, further comprising:
   providing a main flue in communication with the flame path;
   wherein the applying a negative pressure in the flame path comprises applying a negative pressure in the main flue;
wherein the negative pressure in a main flue is in a range of −250 Pa~−300 Pa;
   wherein the plurality of flame path layers comprises eight flame path layers;
   wherein an eighth flame path layer of the eight flame path layers is a flame path layer closest to the pot; and
   a negative pressure in an eighth flame path layer is in a range of −120 Pa~−150 Pa; and
   wherein a negative pressure in a first flame path layer is in a range of −30 Pa~−40 Pa.

* * * * *